United States Patent
Schröpf et al.

(10) Patent No.: US 8,758,857 B2
(45) Date of Patent: Jun. 24, 2014

(54) METHOD AND DEVICE FOR PRODUCING A PORTABLE DATA CARRIER WITH A BUILT-IN ELEMENT

(75) Inventors: Manuela Schröpf, München (DE); Jens Jansen, Oberägeri (CH); Thomas Tarantino, Laufen (DE)

(73) Assignee: Giesecke & Devrient GmbH, Munich (DE)

( * ) Notice: Subject to any disclaimer, the term of this patent is extended or adjusted under 35 U.S.C. 154(b) by 676 days.

(21) Appl. No.: 12/670,076

(22) PCT Filed: Jul. 22, 2008

(86) PCT No.: PCT/EP2008/006003
§ 371 (c)(1),
(2), (4) Date: Jan. 21, 2010

(87) PCT Pub. No.: WO2009/012980
PCT Pub. Date: Jan. 29, 2009

(65) Prior Publication Data
US 2010/0196608 A1    Aug. 5, 2010

(30) Foreign Application Priority Data
Jul. 23, 2007    (DE) .......................... 10 2007 034 172

(51) Int. Cl.
*B05D 3/12*    (2006.01)
(52) U.S. Cl.
USPC .......................................... 427/359

(58) Field of Classification Search
USPC ........................................................ 427/359
See application file for complete search history.

(56) References Cited

U.S. PATENT DOCUMENTS

2005/0179122 A1    8/2005    Okawa et al.
2006/0010685 A1*   1/2006    Kobayashi et al. ............. 29/825

FOREIGN PATENT DOCUMENTS

| DE | 196 45 071 A1 | 5/1998 |
|----|---------------|--------|
| EP | 0 720 123 A2  | 7/1996 |
| EP | 1 244 055 A2  | 9/2002 |

OTHER PUBLICATIONS

International Search Report in PCT/EP2008/006003, Jul. 22, 2008.

* cited by examiner

*Primary Examiner* — Nathan Empie
(74) *Attorney, Agent, or Firm* — Bacon & Thomas, PLLC

(57) ABSTRACT

A method for producing a data carrier which has a built-in element. A recess for receiving the built-in element and a collecting groove for receiving displaced filling material are formed in a core layer. An excess of filling material is specifically provided in the free spaces remaining between the wall of the recess and the built-in element and on the surface. With a covering film interposed, the filling material is then rolled or spread out over the surface by means of a doctor blade.

14 Claims, 3 Drawing Sheets

METHOD AND DEVICE FOR PRODUCING A PORTABLE DATA CARRIER WITH A BUILT-IN ELEMENT

FIELD OF INVENTION

This invention relates to the production of card-shaped data carriers, such as chip cards or identification cards, bearing a relatively large mounted element, e.g. a display.

BACKGROUND

Data carriers of this kind and methods for production thereof have been known for some time, being described for example in "Handbuch der Chipkarten", W. Rankl, W. Effing, Hansa-Verlag, Munich, 4th edition. The data carriers accordingly consist of a card body produced by connecting a plurality of layers or by injection molding, in which an IC is embedded. In the contact-type form, the IC is located in a module which is inserted as a mounted element into a specially prepared recess in the card body. The module bears on its upper side a contact pad which is flush with the surface of the data carrier and becomes part of said surface. The mounting of the module in the recess is effected using an adhesive in such a way that the adhesive at least predominantly fills the free spaces between module contour and recess. The contact pad of the module and the card surface in this manner form a flat surface. In the contactless form of the data carrier, the IC and an antenna connected thereto are located completely within the card body. Although IC and antenna form disturbances with respect to the evenness of the card body, flat card surfaces are normally obtained nevertheless without further measures because IC and antenna form relatively small or filigree structures. However, when large-area mounted elements such as batteries, or wire-embedded coils wound in a plurality of planes, are to be integrated into a card body or placed toward its surface, the attainment of a satisfactorily flat card surface is no longer guaranteed with conventional production methods.

For overcoming this difficulty there is known from DE 196 45 071 A1 the proposal of inserting the mounted elements into prepared recesses and filling the resulting free spaces with adhesive pressurelessly with the help of a stencil and a doctor knife, there being so much adhesive applied to the surface with the mounted elements that after removal of the stencil the entire card body surface located within the stencil is covered with an adhesive layer. While still in the plastic state there is subsequently applied over the adhesive layer a cover foil, and the thereafter existing structure is then cured between a mold surface and a carrier. There finally arises a data carrier having a very flat surface which is formed by the cover foil. However, the method requires the provision of precision tools otherwise not customary in the production of cards, namely a stencil and a mold surface as part of the curing apparatus which determines the flatness of the surface. The handling of the stencil is also impaired by its coming in contact with the adhesive.

SUMMARY

The object of the invention is to specify a method and an apparatus for producing a portable data carrier having a mounted element that provide a flat surface even upon incorporation of large mounted elements and are at the same time realizable on the basis of conventional production methods with as little additional effort as possible.

The inventive method has the advantage that its realization requires only few novel and fairly non-fault-critical method steps to be arranged for in addition to known and well controlled method steps. The method and corresponding apparatus accordingly make only relatively low demands on the tools to be additionally used. In particular, the inventive method avoids the contact between filling material and tools; further, the demands on the metering accuracy upon incorporation of the filling material are also low.

The inventive method yields data carriers having a very flat surface which is formed by a cover foil. Because it can be carried out almost pressurelessly, the load on the mounted elements upon filling of the free spaces is low. It is further also readily possible to integrate a plurality of large mounted elements into a card body. Advantageously, the inventive method is suited for a multi-up production.

Advantageous developments and expedient embodiments of the invention result from the features of the subclaims. Thus, the recesses created in the card bodies for receiving the mounted elements preferably have a positioning aid formed out of the card body, which defines the position of a mounted element in a recess. The recess can thus be executed with relatively great manufacturing tolerance.

Very advantageously, a first part of the filling material is incorporated in the recess before the mounted element is inserted; a second part of the filling material is expediently applied directly to the mounted element. In this manner it is possible to integrate into a card body mounted elements with practically any shaping, in particular irregularly shaped elements, such as push-buttons, or elements with undercuts, such as displays. It is readily also possible to mount multi-part mounted elements in the same manner.

In an especially advantageous embodiment of the inventive method, the data carriers are produced by the multi-up technique in an initially common core layer and later punched out therefrom. Outside the contour of the later data carrier there is created at least one collecting groove which serves to receive excess filling material during production and which is later removed.

BRIEF DESCRIPTION OF THE DRAWINGS

With reference to the drawing an exemplary embodiment of the invention will hereinafter be explained more closely. There are shown FIG. 1 a cross section of a core layer sheet with two later data carriers in a manufacturing situation immediately before the onset of the doctoring operation, FIG. 2 a detail of a core layer sheet with a recess for a mounted element and collecting grooves in plan view, FIG. 3 a cross section of a core layer sheet with a collecting groove and a recess in a manufacturing situation before the insertion of a mounted element in the recess, FIG. 4 a schematically shown cross section of a core layer sheet with two later data carriers while the doctoring operation is being carried out, FIG. 5 a schematic cross section of a core layer sheet in a manufacturing situation immediately after metering of a first amount of non-liquid filling material, FIG. 6 a flowchart of the processing steps for production of a data carrier.

DETAILED DESCRIPTION OF VARIOUS EMBODIMENTS OF THE DISCLOSURE

Figure 1:
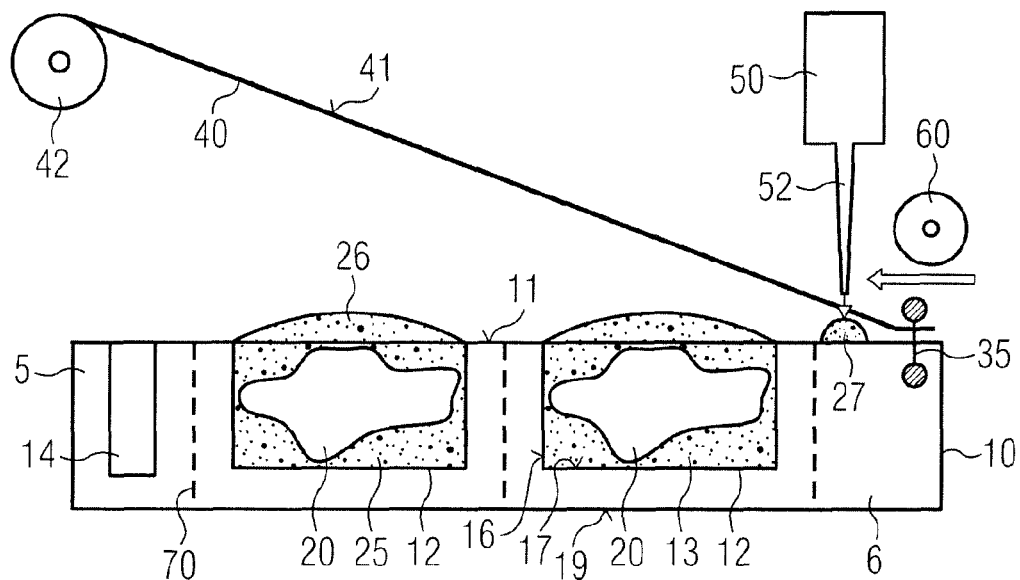

The manufacturing situation shown represented very schematically in FIG. 1 shows in cross section a planar core layer sheet 10 with two outer sides designated as surface 11 and back face 19. There will hereinafter be assumed a multi-up production wherein a plurality of data carriers 1 are first produced in the core layer sheet 10 and later singled. However, the described method can readily also be carried out on an individual data carrier.

In the core layer sheet 10—hereinafter designated simply the core layer—there are created two recesses 12 open toward the surface 11 for receiving mounted elements 20, and a collecting groove 14 likewise open on the surface 11. The recesses 12 are somewhat larger than the mounted elements 20 placed therein. The mounted elements 20 can possess irregular outside contours.

In the free spaces 13 between wall 16 and bottom 17 of a recess 12 and the outside contour of a mounted element 20 there is filling material 25. Likewise, the open space above a mounted element 20 toward the surface 11 is filled with filling material 26. The filling material 26 on the upper side initially protrudes beyond the plane of the surface 11, as indicated in FIG. 1. The reference number 70 designates separating lines along which at a later time the then finished data carriers 1 are singled out of the core layer 10. The edge area 5 of the core layer 10 on the left in FIG. 1 where the collecting groove 14 is located, and the edge area 6 on the right in FIG. 1 where the cover foil 40 is fixed are detached upon singling.

Above the surface 11 there is located a foil reel 42 from which a cover foil 40 is unwound. The cover foil 40 is fastened to the core layer 10 in the edge area 6 along the outer edge of the core layer 10 by a fixing means 35. Between surface 11 and cover foil 40 there is located, likewise in the edge area 6, a filling material reservoir 27 which is applicated by a metering device 50 via a suitable feed 52. Above the cover foil 40, above the edge area 6, there is further an e.g. doctor knife 60 which is drawn or rolled over the surface 11 in the direction indicated by the arrow.

The core layer 10 is typically based on a compound of a plurality of single foils which have been joined e.g. by hot lamination. The creation of the recesses 12 and the collecting grooves 14 is then expediently effected by first punching them out of a core foil 9. Subsequently, as evident from FIG. 3, there is applied to the underside, e.g., by hot lamination, a closing foil 18 for forming the later back face 19. Alternatively to the production with a plurality of foils by punching and reclosing, the creation of the recesses 12 and the collecting grooves 14 can be effected by injection molding of a finished core layer 10; in this case, recesses 12 and collecting grooves 14 are produced directly. In a further variant, the recesses 12 and collecting grooves 14 are produced by means of a miffing technique.

Figure 2:
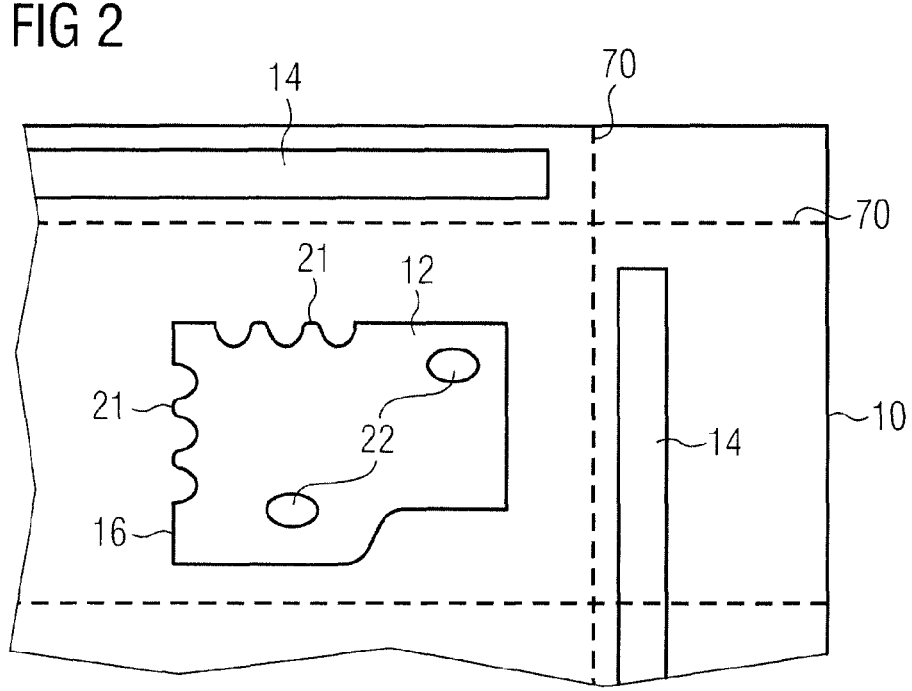

FIG. 2 illustrates the geometrical arrangement of recesses 12 and collecting grooves 14 in a plan view of a detail of a core layer 10. The recesses 12 are located here in the inside area of the core layer 10 side by side in a grid of rows and columns. In the edge area 6, collecting grooves 14 are preferably configured along the outer edges of the core layer 10. Number and geometry of the collecting grooves 14, especially width and length, are so dimensioned that they can receive excess filling material 25, 26, 27 displaced while the production method is carried out. Instead of continuous collecting grooves 14, as indicated in FIG. 2, there can hence also be provided collecting grooves 14 divided into a plurality of small portions, or arrangements of a plurality of parallel collecting grooves 14 in each case. It is also possible to dispose collecting grooves 14 between individual rows or columns of recesses 12. In a further design variant there is provided around each recess 12 a circumferential collecting groove 14 which opens into a larger overflow tub. In all design variants, however, the collecting grooves 14 are always so positioned as to be located outside the separating lines 70 along which the finished data carriers 1 are later detached from the core layer 10.

To support its placement, the recess 12 has positioning aids 21, 22 coordinated with the outer shape of the mounted element 20. Said aids are configured for example, as indicated in FIG. 2, firstly as a relief structure 21 on the vertical inside wall 16 of the recess 12. Secondly it is possible, alternatively or additionally, for support elements 22 to be configured on the bottom 17 of the recess 12. The geometries of the positioning aids 21, 22 indicated in FIG. 2 are intended only by way of example; it is practical for the positioning aids 21, 22 to be adapted to the contour of the mounted element 20 and fix it in a defined position within the recess 12.

Figure 6:
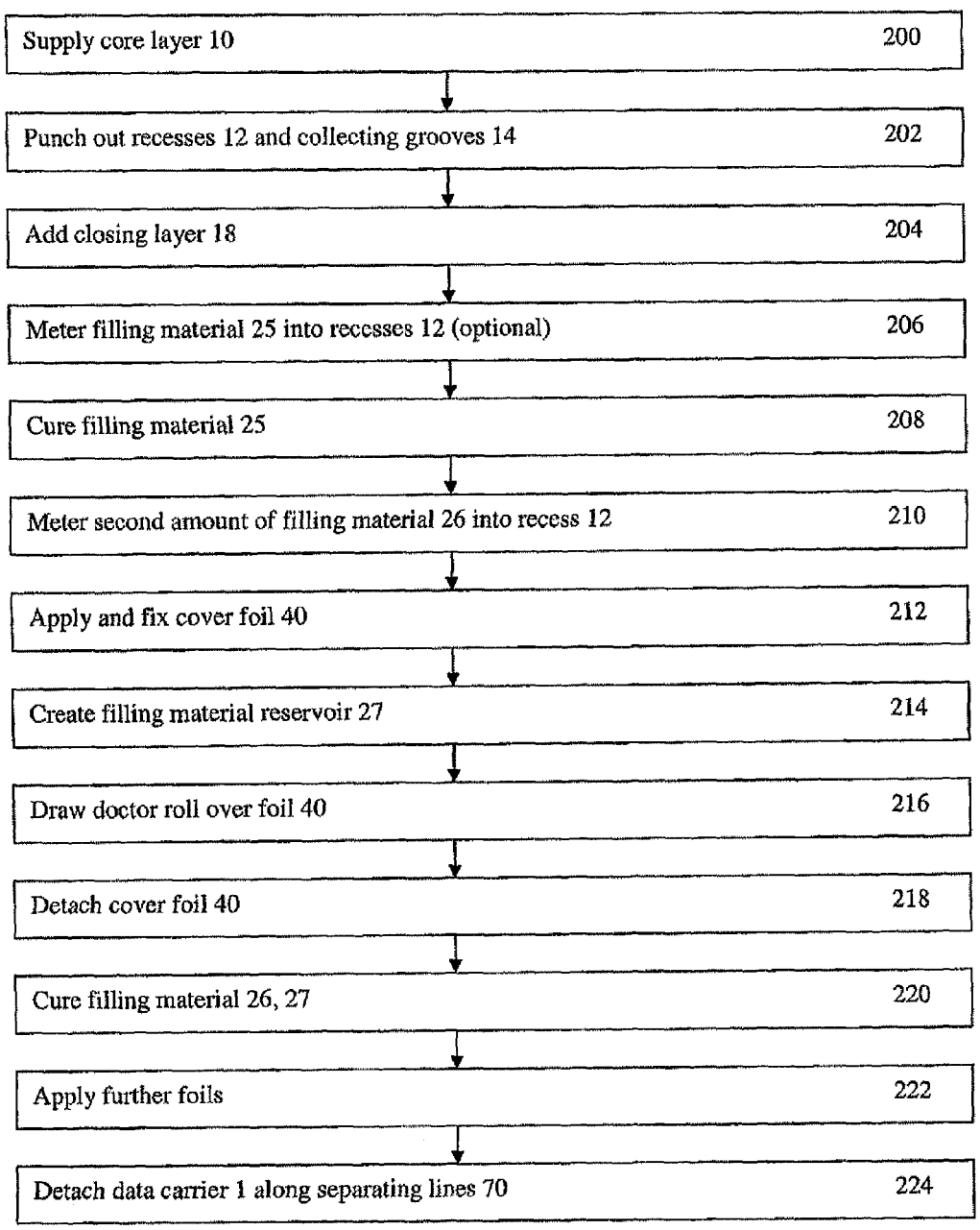

With the help of the flowchart in FIG. 6 the production of a data carrier 1 will hereinafter be described as a sequence of processing steps. The production begins with the supplying of the core layer 10, step 200. The core layer 10 can be obtained for example by laminating a plurality of single foils. It can be transparent or opaque and bear a graphical design and/or security elements toward one of the two outer sides 11, 19.

In the core layer 10 the recesses 12 and the collecting grooves 14 are subsequently created, step 202; this can be effected e.g. by punching out a core foil 9 and subsequently applying a closing layer 18 under the previously produced recesses 12 and collecting grooves 14 on the back, step 204.

Figure 3:
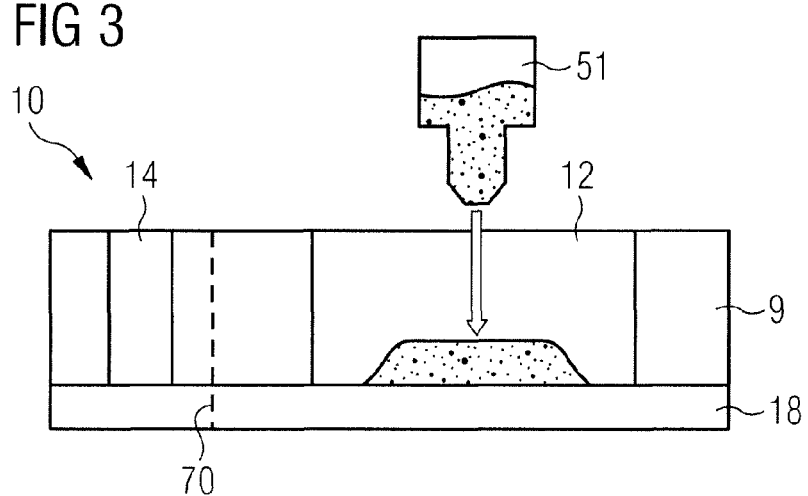

Subsequently, as illustrated in FIG. 3, a first amount of preferably liquid filling material 25 is metered into the recesses 12 by means of a metering device 51 (which can also be the metering device 50), step 206. The amount of filling material 25 is so dimensioned that it preferably completely fills the free spaces 13 between wall 16 and bottom 17 of the recesses 12 and mounted elements 20 after their insertion. The filling material 25 may be for example a photoactivatable adhesive.

The mounted elements 20 are subsequently inserted into the still flow able filling material 25 in the recesses 12, step 208, e.g. by means of a vacuum arm (not shown), whereby the filling material 25 is urged into the free spaces 13. Upon insertion the mounted elements 20 are aligned by the positioning aids 21, 22. The mounted elements 20 can also consist of a plurality of subassemblies that are inserted for example successively, e.g. of a display and a control module to be inserted first. The filling material 25 is then cured, step 208. This can be effected for example by exposure from the back face 19. During curing the position of the mounted elements 20 is optionally readjusted by urging them against the positioning aids 21, 22.

Subsequently, step 210, a second amount of filling material 26 is metered into the recess 12 by means of the metering device 51; the filling material 26 here is expediently the same as that incorporated first. The amount of the filling material 26 is so dimensioned that it completely fills the recess 12 with the mounted element 20 located therein and furthermore forms a slight excess which protrudes beyond the surface 11 of the core layer 10.

The cover foil 40 is subsequently brought over the thus completely filled recesses 12 and fixed by the fixing means 35 in the edge area 6 of the core layer 10, step 212. The cover foil 40 is first so supplied that it does not yet touch the surface 11 of the core layer 10 and likewise the filling material protrusions 26, as indicated in FIG. 1. The cover foil 40 can be coated with adhesive toward the surface 11.

In the edge area 6 of the core layer 10, outside the separating lines 70, a third amount of filling material 27 is then metered as a reservoir in pointwise fashion by means of the metering device 50; the filling material 27 is expediently again identical with that previously employed. The filling material reservoir 27 expediently extends across the whole width of the core layer 10 and has for example the form of a roll, a dune or a sequence of heaps.

Figure 4:
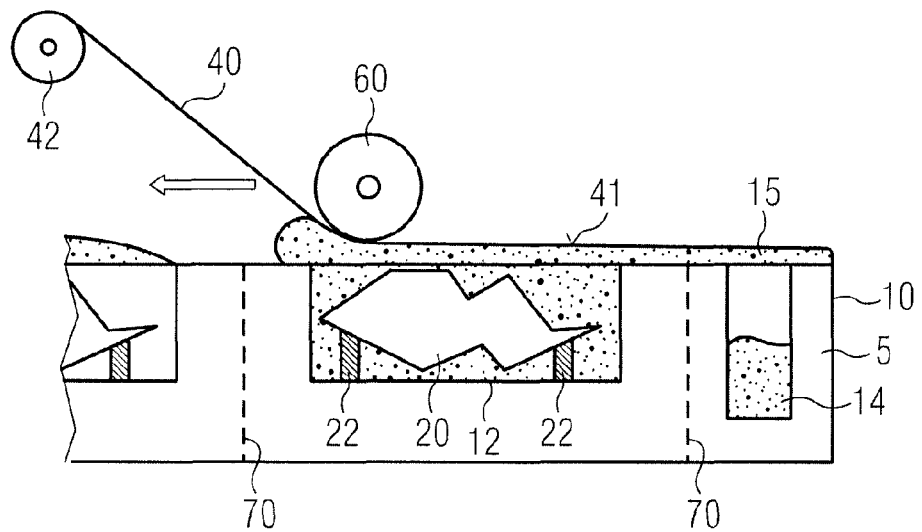

Thereafter the cover foil 40 is applied to the core layer 10 and connected thereto. For this purpose, the doctor knife 60 is drawn over the cover foil 40 in the direction of the arrow beginning in the edge area 6 at the fixing means 35, whereby the cover foil 40 is urged against the surface 11 of the core layer 10, as illustrated in FIG. 4, step 216. The pressure motion causes first the filling material reservoir 27 next to the fixing means 35 and then the filling material protrusions 26 projecting beyond the recesses 12 to be displaced and uniformly spread over the total surface 11 of the core layer 10. Excess filling material 26, 27 is thereby urged into the collecting grooves 14, as indicated in FIG. 4 on the right. The pressure exerted upon the motion of the doctor knife 60 against the surface 11 is so adjusted that a film 15 of filling material 26, 27 with a desired thickness foiius between cover foil 40 and surface 11. Filling material 26, 27, thickness of filling material film 15 and pressure can be coordinated with each other in particular such that the mounted element 20 is hardly or not at all compression-loaded. After the doctor knife 60 has been moved completely over the core layer 10, the cover foil 40 is located uniformly over the surface 11 of the core layer 10 with interposition of a thin layer of filling material 26, 27.

The cover foil 40 is thereafter detached at the edge of the core layer 10, step 218. Subsequently, the filling material 26, 27 is cured, step 220; this can be effected for example by exposure from the upper side 11.

On the thereafter existing structure there can optionally be applied further foils, e.g. design foils, on the front and/or on the back, step 222.

Finally, the thereafter existing finished data carriers 1 are detached from the core layer 10 along the separating line 70, e.g. by punching or cutting. The edge areas 5, 6 with the collecting grooves 14 or with the fixing means 35 are left over and disposed of.

While retaining the basic approach of producing a data carrier 1 having a mounted element 20 by inserting the mounted element 20 into a recess 12 prepared in the data carrier 1, then filling the recess 12 with filling material 25, 26, 27 in a plurality of steps, and subsequently rolling out or doctoring in protruding filling material with the help of a doctor knife 60 with interposition of a cover foil 40, the inventive solution permits a multiplicity of further embodiments. Thus, individual method steps can be omitted, such as the steps 208 or 222, or be performed earlier or later by being carried out at a different time; it is for example possible to create an excess of filling material only by one of the steps 210 or 214. Also, further steps can be added. For example, it can be provided to heat the structure existing after the curing of the filling material 25, 26, 27 in step 220 in a suitable apparatus again in order to reduce surface tensions resulting upon rolling out of the cover foil 40 and to obtain a very smooth surface 41. The curing of the filling material 25, 26, 27 can also already be begun during the rolling out of the cover foil 40 or even before the onset of the rolling out of the cover foil 40. It can further be effected in a single uniform step or in more than the substeps stated in the example. Furthermore, there can be provided instead of the cited method steps alternative ones, such as injection molding of a core layer instead of punching and adding a closing layer according to steps 202, 204.

Figure 5:
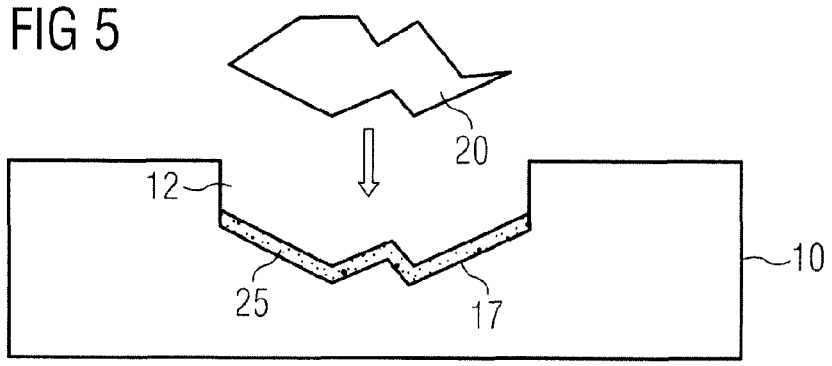

In the filling material 25, 26, 27 there can further be incorporated security elements, such as reflective or magnetic particles or thermally reactive components. In an advantageous variant of step 206 illustrated in FIG. 5 there is employed for the first amount of filling material 25 a non-flowing material which precisely reproduces the internal contour of the recess 12. The bottom 17 of the recess 12 can then possess a contoured surface adapted to the contour of the mounted element 20, resulting in an adapted, gradated free space into which the mounted element 20 can be inserted in an accurate fit.

There is also considerable freedom of design in the supplying of the cover foil 40 and the arranging for its fixing means 35. The produced data carrier 1 can further be a finished product, e.g. a chip card with a display, or else a half-product, such as an inlay with a display, which must be connected to further components to obtain a ready-to-use product.

The invention claimed is:

1. A method for producing a data carrier having a mounted element, said method comprising the steps:

providing a core layer having a top surface and at least one recess produced in the top surface, placing the mounted element in the at least one recess therein, filling free spaces remaining between a recess wall of the at least one recess and the mounted element pressurelessly by mechanical distribution of a filling material initially applied in pointwise fashion, from the top surface of the core layer, supplying an excess of filling material in the at least one recess and/or on the top surface of the core layer, and then rolling out or doctoring out the filling material over the top surface of the core layer with interposition of a cover foil so that the excess filling material is displaced and uniformly spread completely over the top surface of the core layer, in such a way that a film of filling material forms between the cover foil and the top surface of the core layer.

2. The method according to claim 1, including creating the at least one recess in the core layer larger than the mounted element.

3. The method according to claim 1, including providing the at least one recess with a positioning aid which defines the position of the mounted element in the recess.

4. The method according to claim 3, including configuring the positioning aid as a relief structure on the wall of the at least one recess and/or as a support element on the bottom of the recess.

5. The method according to claim 1, including creating in the core layer, neighboring to the at least one recess, at least one collecting groove which serves to receive excess filling material.

6. The method according to claim 1, including producing the at least one recess by first creating a hole in a core foil and then closing the latter on the back using a closing layer.

7. The method according to claim 1, including first metering a first amount of filling material into the at least one recess before inserting the mounted element.

8. The method according to claim 7, including curing the filling material after insertion of the mounted element.

9. The method according to claim 7, including after insertion of the mounted element into the at least one recess, metering a second amount of filling material into the at least one recess.

10. The method according to claim 1, including curing the filling material after application of the cover foil.

11. The method according to claim 1, including applying a reservoir of filling material in an edge area of the core layer, said edge area not being part of the finished data carrier.

12. The method according to claim 11, including fastening a cover foil in the edge area of the core layer by a fixing means.

13. The method according to claim 11, including doctoring on or rolling on the cover foil over the top surface and the at least one recess with the filling material beginning at the edge area of the core layer.

14. The method according to claim 11, including detaching the edge area of the core layer along separating lines on the core layer, so that a data carrier is produced.

* * * * *